United States Patent
Adachi et al.

(10) Patent No.: US 10,633,102 B2
(45) Date of Patent: Apr. 28, 2020

(54) SCREEN DEVICE AND IMAGE PROJECTION SYSTEM

(71) Applicant: Panasonic Intellectual Property Management Co., Ltd., Osaka (JP)

(72) Inventors: Yusuke Adachi, Osaka (JP); Motonobu Yoshikawa, Osaka (JP); Masahiro Inata, Hyogo (JP); Norikazu Katsuyama, Osaka (JP); Ryo Okumura, Osaka (JP); Fumio Muramatsu, Kyoto (JP); Naoto Yumiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 15/557,858

(22) PCT Filed: May 18, 2016

(86) PCT No.: PCT/JP2016/002429
§ 371 (c)(1),
(2) Date: Sep. 13, 2017

(87) PCT Pub. No.: WO2017/002298
PCT Pub. Date: Jan. 5, 2017

(65) Prior Publication Data
US 2018/0072428 A1   Mar. 15, 2018

(30) Foreign Application Priority Data
Jun. 29, 2015   (JP) ................................. 2015-129418

(51) Int. Cl.
*B64D 27/24* (2006.01)
*G03B 21/56* (2006.01)
(Continued)

(52) U.S. Cl.
CPC .............. *B64D 27/24* (2013.01); *B64C 39/02* (2013.01); *B64C 39/024* (2013.01);
(Continued)

(58) Field of Classification Search
CPC .......... B64D 27/24; G03B 21/56; B64C 39/02
See application file for complete search history.

(56) References Cited

U.S. PATENT DOCUMENTS

| 6,278,904 B1 | 8/2001 | Ishii |
| 2004/0021939 A1 | 2/2004 | Kobayashi |

(Continued)

FOREIGN PATENT DOCUMENTS

| JP | 4-250438 | 9/1992 |
| JP | 6-175128 | 6/1994 |

(Continued)

OTHER PUBLICATIONS

International Search Report of PCT application No. PCT/JP2016/002429 dated Jul. 12, 2016.

*Primary Examiner* — Nicholas K Wiltey
*Assistant Examiner* — Tiffany K Luu
(74) *Attorney, Agent, or Firm* — Wenderoth, Lind & Ponack, L.L.P.

(57) ABSTRACT

A screen device includes a screen, a plurality of first photoelectric conversion elements, a plurality of second photoelectric conversion elements, a flying object, a support member, and a controller. The plurality of first photoelectric conversion elements are on the screen and are arranged at an outermost periphery, in a frame shape, of an area in which photoelectric conversion elements are arranged. The plurality of second photoelectric conversion elements are on the screen and are arranged inside the area at the outermost periphery covered by the plurality of first photoelectric conversion elements. The flying object is configured to be
(Continued)

powered by electric power generated by the plurality of second photoelectric conversion elements. The support member connects the screen with the flying object. The controller is configured to control the flying object based on an evaluation of the electric power generated by the plurality of first photoelectric conversion elements.

7 Claims, 11 Drawing Sheets

(51) Int. Cl.
*B64C 39/02* (2006.01)
*G09F 19/18* (2006.01)
*G03B 21/14* (2006.01)
*G09F 21/14* (2006.01)
*G05D 1/10* (2006.01)
*H04N 9/31* (2006.01)
*G05D 1/00* (2006.01)

(52) U.S. Cl.
CPC ........... *G03B 21/147* (2013.01); *G03B 21/56* (2013.01); *G03B 21/562* (2013.01); *G05D 1/0088* (2013.01); *G05D 1/101* (2013.01); *G09F 19/18* (2013.01); *G09F 21/14* (2013.01); *H04N 9/3155* (2013.01); *H04N 9/3188* (2013.01); *H04N 9/3194* (2013.01); *B64C 2201/042* (2013.01); *B64C 2201/12* (2013.01); *B64C 2201/141* (2013.01)

(56) References Cited

U.S. PATENT DOCUMENTS

| | | | |
|---|---|---|---|
| 2005/0103943 A1* | 5/2005 | Tanielian | B64C 39/024 244/190 |
| 2005/0259150 A1* | 11/2005 | Furumi | G09F 21/06 348/144 |
| 2007/0041092 A1* | 2/2007 | Fricke | G03B 21/14 359/443 |
| 2009/0079942 A1 | 3/2009 | Lee et al. | |
| 2009/0091623 A1* | 4/2009 | Krogstad | G03B 21/53 348/189 |
| 2009/0230237 A1* | 9/2009 | Tillotson | F24S 50/20 244/30 |
| 2012/0044467 A1* | 2/2012 | Nakayama | G03B 21/00 353/85 |
| 2012/0150364 A1 | 6/2012 | Tillotson et al. | |
| 2013/0057466 A1* | 3/2013 | Kawasaki | H04N 9/3182 345/156 |

FOREIGN PATENT DOCUMENTS

| | | |
|---|---|---|
| JP | 9-005697 | 1/1997 |
| JP | 2000-289695 | 10/2000 |
| JP | 2002-006784 | 1/2002 |
| JP | 2003-270721 | 9/2003 |
| JP | 2003-280568 | 10/2003 |
| JP | 2004-078167 | 3/2004 |
| JP | 2005-119402 | 5/2005 |
| JP | 2005-122384 | 5/2005 |
| JP | 2014-500827 | 1/2014 |
| WO | 2006/080688 | 8/2006 |
| WO | 2012/078232 | 6/2012 |

* cited by examiner

SCREEN DEVICE AND IMAGE PROJECTION SYSTEM

This application is a U.S. national stage application of the PCT International Application No. PCT/JP2016/002429 filed on May 18, 2016, which claims the benefit of foreign priority of Japanese patent application No. 2015-129418 filed on Jun. 29, 2015, the contents all of which are incorporated herein by reference.

TECHNICAL FIELD

The present disclosure relates to a screen device and an image projection system which are configured such that a flying object flying in the sky supports a screen which receives image light from an image projection device.

BACKGROUND ART

Such conventional screen device and image projection system are known that use a flying object flying in the sky to support a screen which receives image light from an image projection device. The flying object is powered by electric power supplied from a flight power battery to fly (see PTL 1, for example).

CITATION LIST

Patent Literature

PTL 1: Unexamined Japanese Patent Publication No. 2005-119402

SUMMARY OF THE INVENTION

In the conventional configuration, however, the flight powering battery that can be carried on the flying object is required to be light in weight, so that the capacity of the battery is limited. Accordingly, the flying object can fly for only a short time (ten and several minutes).

An object of the present disclosure is to solve the above problem of the conventional screen device and image projection system, and to provide a screen device and an image projection system that allow the flying object to fly for a longer time.

To solve the above problem, each of a screen device and an image projection system in accordance with the present disclosure comprises: a screen that has a plurality of photoelectric conversion elements and receives image light from an image projection device; a power supply unit that supplies electric power generated by photoelectric conversion from the received image light by the plurality of photoelectric conversion elements; a flying object that supports the screen and flies on the electric power supplied from the power supply unit; and a flight controller that controls flight of the flying object.

It is possible by the screen device and the image projection system in accordance with the present disclosure to fly the flying object for a longer time.

DESCRIPTION OF EMBODIMENTS

Hereinafter, exemplary embodiments will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the disclosed embodiments.

Also, it should be noted that the following description and the accompanying drawings are provided to allow any person skilled in the art to fully understand the present disclosure, and that it is not intended to limit the subject matter described in the claims by the following description.

First Exemplary Embodiment

Figure 1:
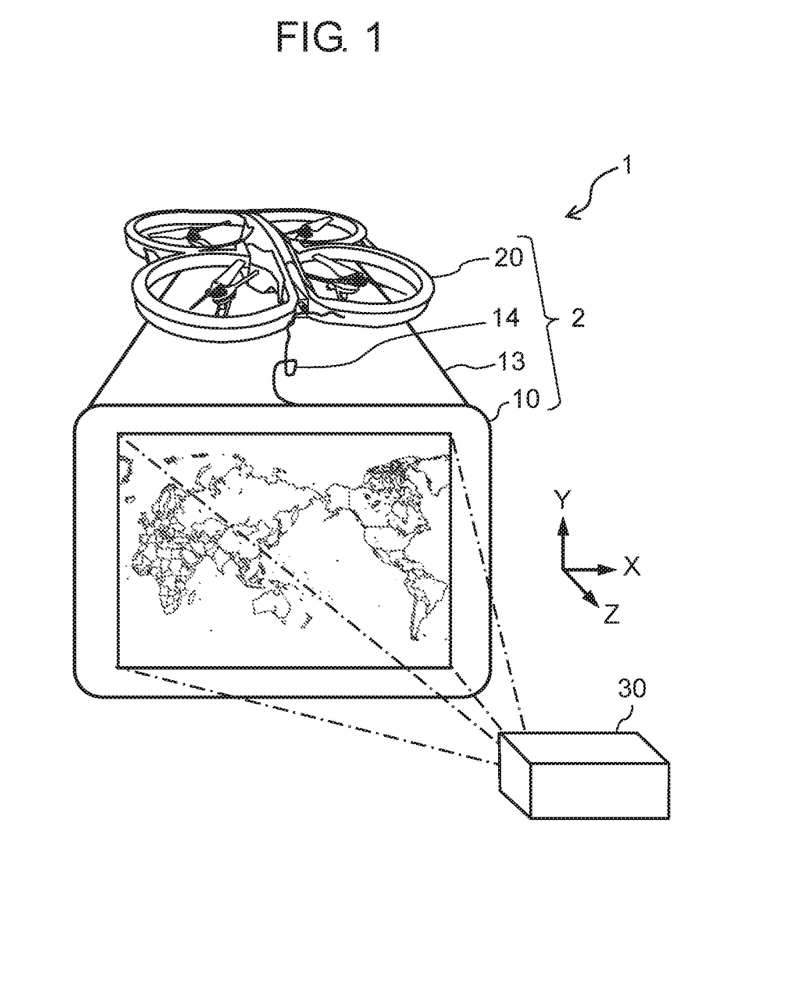
FIG. 1 is a schematic diagram illustrating an image projection system in accordance with a first exemplary embodiment.

First, a configuration of image projection system 1 of the present disclosure will be described. FIG. 1 is a schematic diagram illustrating image projection system 1 in accordance with a first exemplary embodiment.

As shown in FIG. 1, image projection system 1 of the present disclosure is configured by screen device 2 having flying object 20 and screen 10 supported by flying object 20, and image projection device 30. Screen 10 is supported on flying object 20 with support members 13 so that screen 10 can fly in the sky in a horizontal direction (a X direction), a vertical direction (a Y direction) and a projection direction from image projection device 30 to screen 10 (a Z direction). Screen 10 and flying object 20 are electrically connected to each other through cable 14. Screen 10 receives image light projected from image projection device 30. Flying object 20 can be supplied with electric power from screen 10. Referring to FIG. 1, the rightward direction of screen 10 is defined as a +X direction, the upward direction of screen 10 is defined as a +Y direction, and the direction from screen 10 to image projection device 30 is defined as a +Z direction. Rotation directions viewed from a plus (+) direction of a rotation axis are defined such that the rightward rotational direction is a plus (+) rotational direction and the leftward rotational direction is a minus (−) rotational direction.

Figure 2:
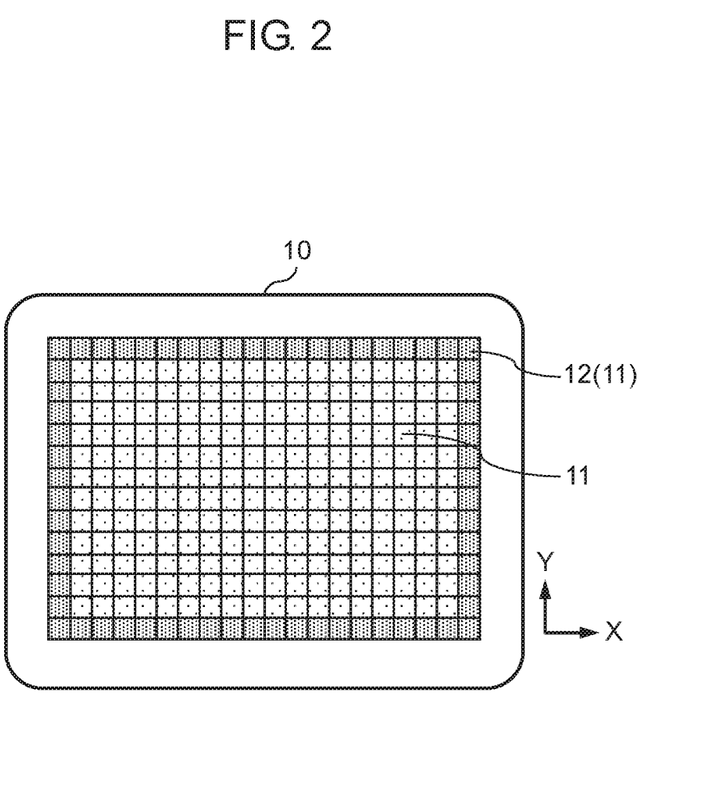
FIG. 2 is a schematic diagram illustrating a screen in accordance with the first exemplary embodiment.

FIG. 2 is a schematic diagram illustrating screen 10 in accordance with the first exemplary embodiment. A diffusion member is disposed over an entire front surface of screen 10 to diffuse light so that an image can be displayed. Also, as shown in FIG. 2, screen 10 has a plurality of photoelectric conversion elements 11 arranged in a matrix (280 elements arranged in 20 columns by 14 rows) on the surface of screen 10. Photoelectric conversion elements 11 generate electric power from image light projected onto the screen and supply the electric power to flying object 20.

Among photoelectric conversion elements 11, those particularly used as evaluation photoelectric conversion elements 12 are arranged in the X direction and the Y direction at the outermost periphery including four corners of the area in which photoelectric conversion elements 11 are arranged. The plurality of evaluation photoelectric conversion elements 12 are connected to flying object 20 to supply electric power so that electric power generated by each of evaluation photoelectric conversion elements 12 can individually be measured. By measuring electric power generated by each of evaluation photoelectric conversion elements 12, it is possible to determine whether the image light from image projection device 30 is correctly projected onto the screen. In the present exemplary embodiment, as shown in FIG. 2, all photoelectric conversion elements 11 arranged at the outermost periphery are evaluation photoelectric conversion elements 12. However, evaluation photoelectric conversion elements 12 may be arranged at intervals of one to several photoelectric conversion elements.

Figure 3:
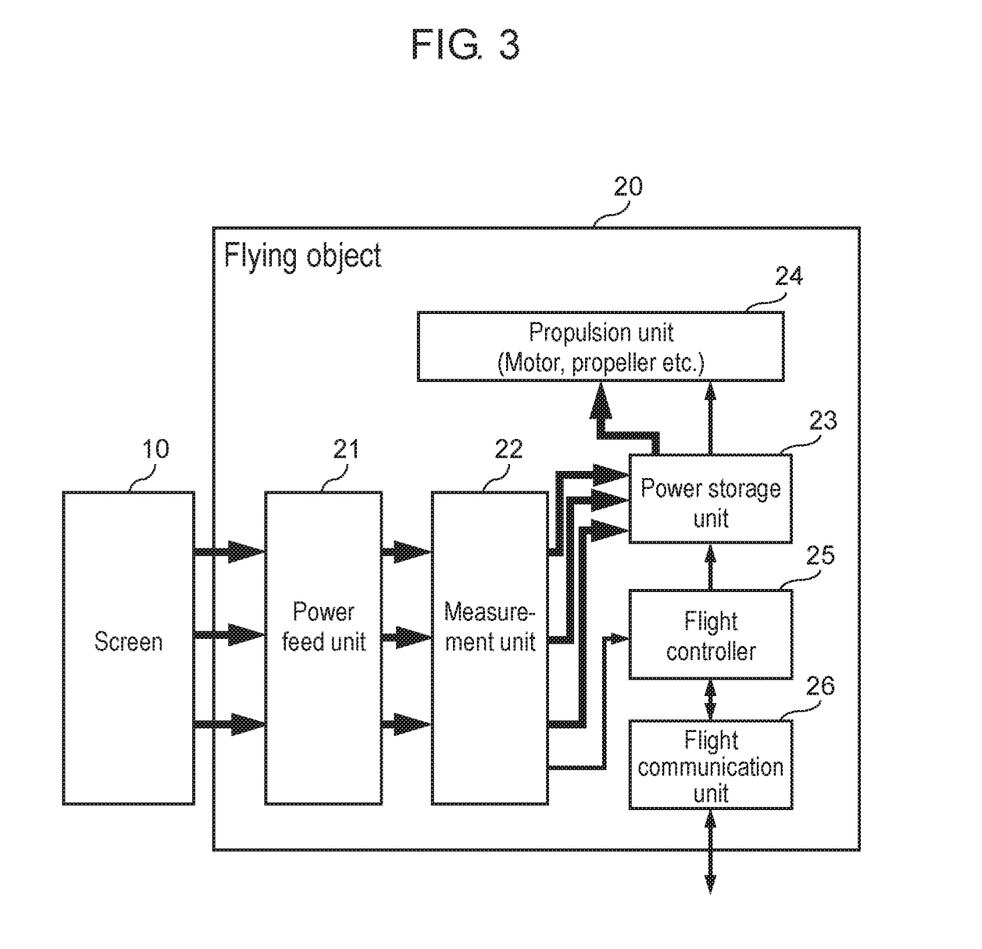
FIG. 3 is a block diagram illustrating a screen device in accordance with the first exemplary embodiment.

FIG. 3 is a block diagram illustrating screen device 2 in accordance with the first exemplary embodiment. Screen device 2 comprises screen 10, and flying object 20 supplied with the electric power generated by screen 10. Flying object 20 is configured by power supply unit 21, measurement unit 22, power storage unit 23, propulsion unit 24, flight controller 25, and flight communication unit 26.

Power supply unit 21 collects the generated electric power from the plurality of photoelectric conversion elements 11 of screen 10, and upconverts the voltage to a reference voltage. While collecting the electric power from photoelectric conversion elements 11, power supply unit 21 also collects individual electric power from each of evaluation photoelectric conversion elements 12.

With respect to the electric power collected at power supply unit 21, measurement unit 22 measures a total electric power value representing a total amount of electric power generated by all photoelectric conversion elements 11, and measures also respective evaluation electric power values representing respective amounts of electric power generated by evaluation photoelectric conversion elements 12.

Power storage unit 23 stores the electric power from measurement unit 22. Power storage unit 23 may be a secondary battery such, for example, as a lithium-ion battery or a nickel-hydrogen battery.

Propulsion unit 24 is powered by the electric power from power storage unit 23 to propel flying object 20 to fly in the sky. Propulsion unit 24 may be configured, for example, by a motor and a propeller.

Flight controller 25 receives data of the total electric power value and the evaluation electric power values from measurement unit 22. Based on these data, flight controller 25 controls the flight of flying object 20 to move or rotate screen 10. Specific flight controls by flight controller 25 will be described later.

Flight communication unit 26 communicates with image projection device 30 according to an instruction of flight controller 25. Flight communication unit 26 transmits energy data such, for example, as the total electric power value and the evaluation electric power values, and an instruction signal indicating, for example, a brightness-up instruction, a rotation instruction or a move instruction. Also, flight communication unit 26 receives an instruction signal from image projection device 30, and outputs the received instruction signal to flight controller 25.

Also, flying object 20 may have an acceleration sensor (not shown in the figures). The acceleration sensor may detect a tilt of flying object 20 in the horizontal direction. Based on the detection result from the acceleration sensor, flight controller 25 may control propulsion unit 24 to correct the tilt of screen 10 in the horizontal direction so that screen 10 is positioned horizontal.

Figure 4:
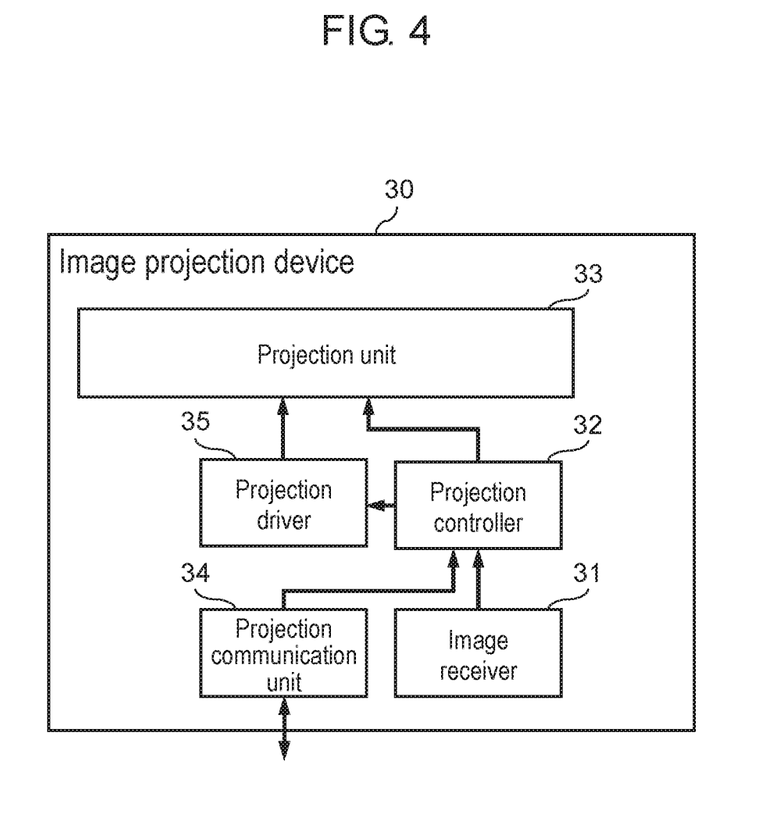
FIG. 4 is a block diagram illustrating an image projection device in accordance with the first exemplary embodiment.

FIG. 4 is a block diagram illustrating image projection device 30 in accordance with the first exemplary embodiment. Image projection device 30 is configured by image receiver 31, projection controller 32, projection unit 33, projection communication unit 34, and projection driver 35.

Image receiver 31 receives an image signal from, for example, a television tuner, a video recorder, a personal computer, or the like.

Projection controller 32 adjusts the brightness and the like of the image based on the image signal received from image receiver 31, and causes projection unit 33 to project image light. Also, projection controller 32 adjusts the brightness, projection angle and projection position of projection unit 33, based on signals received from projection communication unit 34.

Projection unit 33 projects the image light received from projection controller 32 onto screen 10. Projection unit 33 may be configured by a projection lens and the like.

Projection communication unit 34 receives an instruction signal from flying object 20 and an external operation device such, for example, as a remote controller (not shown in the figures), and outputs the received instruction signal to projection controller 32. Also, projection communication unit 34 transmits an instruction signal from projection controller 32 to flying object 20.

Projection driver 35 drives projection unit 33 under control by projection controller 32 to change a projection angle and a projection position of the image projected by projection unit 33.

Figure 5:
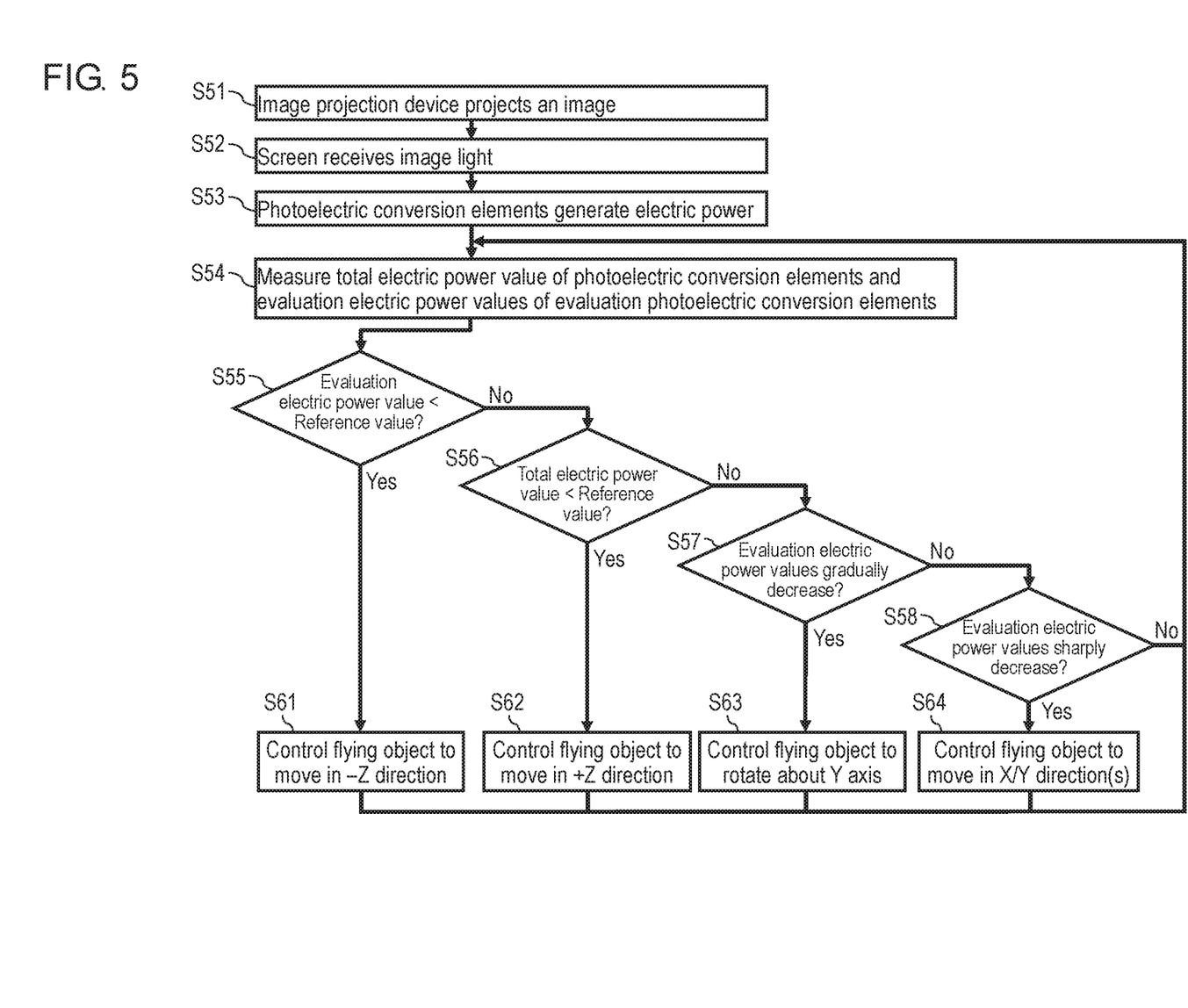
FIG. 5 is a flowchart illustrating operations of the image projection system in accordance with the first exemplary embodiment.

Next, operations of image projection system 1 of the present exemplary embodiment will be described. FIG. 5 is a flowchart illustrating operations of image projection system 1 in accordance with the first exemplary embodiment.

Image projection device 30 projects image light in the −Z direction onto screen 10 (step S51). Screen 10 receives the image light projected from image projection device 30 (step S52). Photoelectric conversion elements 11 of screen 10 generate electric power from the received image light (step S53). Screen 10 supplies all electric power generated by all photoelectric conversion elements 11 to power supply unit 21 of flying object 20. In this power supplying, screen 10 separately supplies electric power generated by each of evaluation photoelectric conversion elements 12 to power supply unit 21 so that the amount of power generated by each of evaluation photoelectric conversion elements 12 can individually be measured.

Measurement unit 22 of flying object 20 measures, based on the electric power supplied from power supply unit 21, a total electric power value generated by photoelectric conversion elements 11 and respective evaluation electric power values generated by the plurality of evaluation photoelectric conversion elements 12, each as an average value during a specified time (e.g., 5 seconds) (step S54). The specified time may not be limited to 5 seconds, and may be appropriately set depending on the movement of flying object 20. For example, it is preferable that the specified time is set to a short time (1 second to 3 seconds) when flying object 20 moves quickly, and is set to a long time (30 seconds to two minutes) when flying object 20 moves slowly. Also, the period for averaging the electric power may be made different from the period for performing control.

Figure 6:
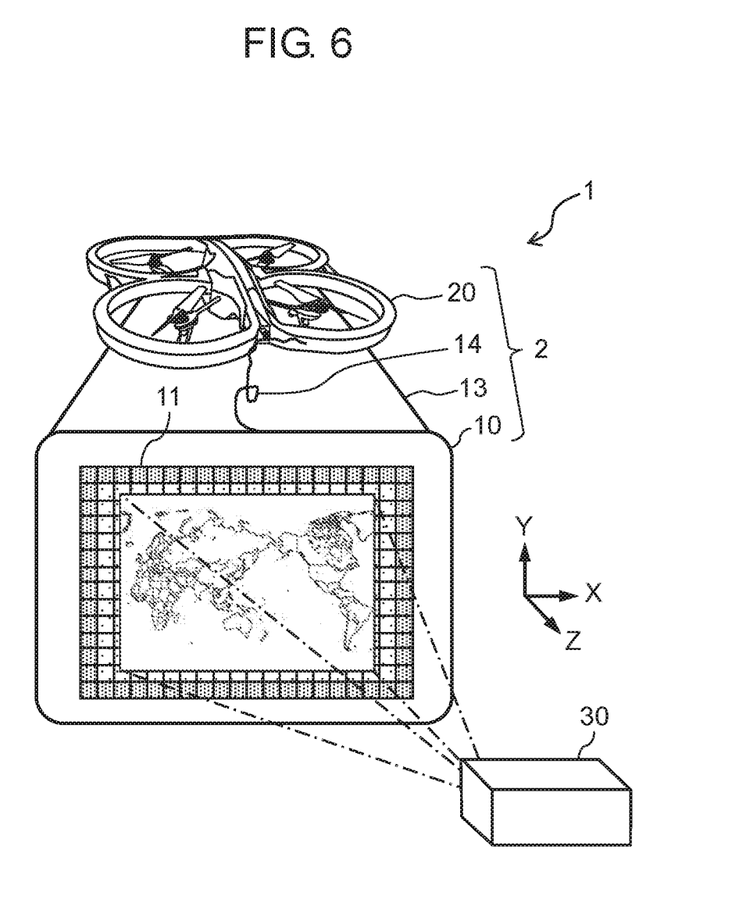
FIG. 6 is a schematic diagram illustrating the screen in accordance with the first exemplary embodiment shifted in a +Z direction.

Next, flight controller 25 determines whether all evaluation electric power values of evaluation photoelectric conversion elements 12 measured by measurement unit 22 are smaller than a specified reference value (e.g., 0.1 W) (step S55). FIG. 6 is a schematic diagram illustrating screen 10 shifted in the +Z direction. As shown in FIG. 6, such a case sometimes occurs that the distance between screen 10 and image projection device 30 decreases, and that the image light from image projection device 30 is projected onto a reduced area on screen 10 which is smaller than the area in which evaluation photoelectric conversion elements 12 are arranged. In this case, although all the image light from image projection device 30 is received by photoelectric conversion elements 11, the image light is not projected onto evaluation photoelectric conversion elements 12 located at the periphery of the area in which photoelectric conversion elements 11 are arranged, so that the value of evaluation electric power generated by each of evaluation photoelectric conversion elements 12 becomes smaller (nearly zero) than the specified reference value. Accordingly, the determination result in step S55 becomes "Yes".

In a case where every value of evaluation electric power is smaller than the specified reference value ("Yes" in step S55), flight controller 25 causes flying object 20 to move backward (in the −Z direction) to be away from image projection device 30 so that evaluation photoelectric conversion elements 12 can receive the image light (step S61). Then, the operation flow returns to step S54.

Figure 7:
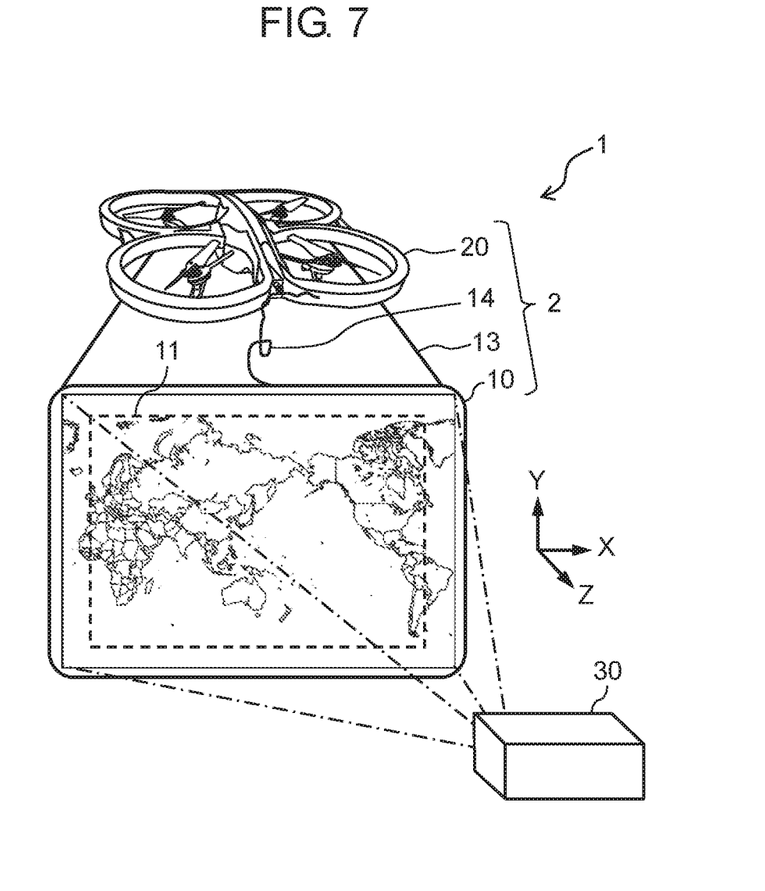
FIG. 7 is a schematic diagram illustrating the screen in accordance with the first exemplary embodiment shifted in a −Z direction.

In a case where a value of evaluation electric power of evaluation photoelectric conversion elements 12 is not smaller than the specified reference value ("No" in step S55), flight controller 25 determines whether the total electric power value measured by measurement unit 22 is smaller than a reference value (e.g., 20 W) required to power flying object 20 to fly (step S56). FIG. 7 is a schematic diagram illustrating screen 10 shifted in the −Z direction. As shown in FIG. 7, such a case sometimes occurs that the distance between screen 10 and image projection device 30 increases, and that the image light from image projection device 30 is projected onto an extended area on screen 10 which is larger than the area in which photoelectric conversion elements 11 are arranged. In this case, since all evaluation photoelectric conversion elements 12 receive the projected image light, the value of evaluation electric power generated by each of evaluation photoelectric conversion elements 12 is not smaller than the specified reference value. However, since the image light is extended outside the area in which photoelectric conversion elements 11 are arranged, the total electric power value of photoelectric conversion elements 11 becomes smaller than the reference value. Accordingly, the determination result in step S56 becomes "Yes".

In a case where the total value of electric power is smaller than the specified reference value ("Yes" in step S56), flight controller 25 causes propulsion unit 24 to move flying object 20 forward (in the +Z direction) to be closer to image projection device 30 (step S62). This reduces the area in which the image light from image projection device 30 is projected onto screen 10 to be close to the area in which photoelectric conversion elements 11 are arranged. Then, the operation flow returns to step S54.

In a case where the total electric power value of photoelectric conversion elements 11 is not smaller than the specified reference value ("No" in step S56), flight controller 25 determines whether the evaluation electric power values measured by measurement unit 22 gradually decrease at a gradient within a specified range in a horizontally-arranged order of evaluation photoelectric conversion elements 12 (step S57).

Figure 8:
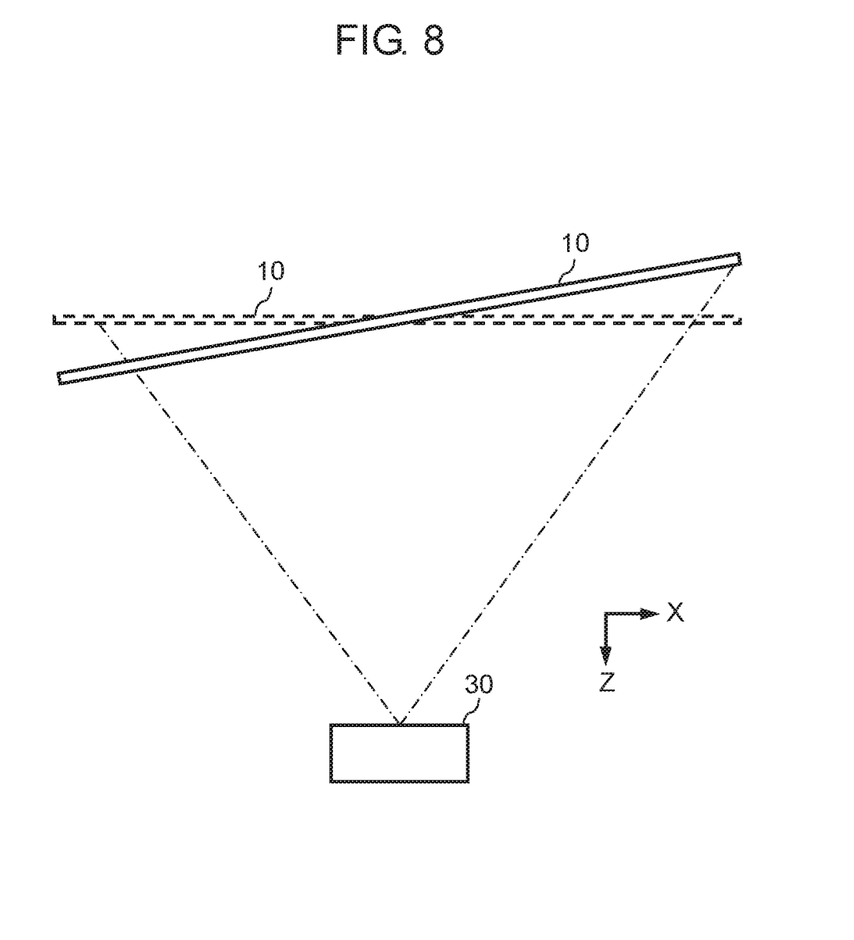
FIG. 8 is a schematic diagram illustrating the screen in accordance with the first exemplary embodiment rotated about a Y axis.

FIG. 8 is a schematic diagram illustrating screen 10 rotated about the Y axis. FIG. 8 shows a state in which screen 10 is inclined (indicated by a solid line) relative to a normal state (indicated by a broken line). In this case, the image light from image projection device 30 is obliquely projected onto screen 10. In this state, the evaluation electric power values gradually decrease in the horizontally-arranged order of evaluation photoelectric conversion elements 12 (in order from the −X end, closest to image projection device 30, to the +X end, farthest from image projection device 30). Accordingly, the determination result in step S57 becomes "Yes". In this case, the determination whether the evaluation electric power values are gradually decreasing in the horizontally-arranged order may be made for at least one of the uppermost row of evaluation photoelectric conversion elements 12 and the lowermost row of evaluation photoelectric conversion elements 12, in photoelectric conversion elements 11 of screen 10. The gradual decrease may be determined by examining whether the gradient of the decreasing evaluation electric power values of evaluation photoelectric conversion elements 12 in the horizontally-arranged order is within the specified range.

In a case where the evaluation electric power values of evaluation photoelectric conversion elements 12 gradually decrease ("Yes" in step S57), flight controller 25 controls flying object 20 to rotate about the Y axis (step S63). The rotating direction can be determined based on the direction in which the evaluation electric power values gradually decrease (the +X or −X direction). In this operation, flight controller 25 causes flying object 20 to rotate until a difference between the evaluation electric power values becomes out of a specified range. Then, the operation flow returns to step S54.

Rotations about the X axis and about the Z axis will be described. A rotation about the X axis may be determined, in a way, by using the evaluation electric power values of evaluation photoelectric conversion elements 12 arranged in the Y direction, in the same manner as that shown in FIG. 8. However, screen 10 does not so much rotate about the X axis, because it is kept horizontal due to gravity. A rotation about the Z axis may be determined by determining that the evaluation electric power values of the evaluation photoelectric conversion element 12 disposed at the four corners of screen 10 become almost zero. However, the rotation about the Z axis is not a noticeable problem, because screen 10 is kept horizontal under a control using an acceleration sensor of flying object 20.

In a case where the evaluation electric power values are not gradually decreasing ("No" in step S57), flight controller 25 compares evaluation electric power values of adjacent two of evaluation photoelectric conversion elements 12 in their arranged order to determine whether the evaluation electric power values are sharply decreasing (step S58). Sharp decrease of the evaluation electric power values may be determined based on whether a value of evaluation electric power generated by one evaluation photoelectric conversion element 12 is smaller than a specified value (e.g., 1/10) relative to a value of evaluation electric power generated by an adjacent evaluation photoelectric conversion element 12.

Figure 9:
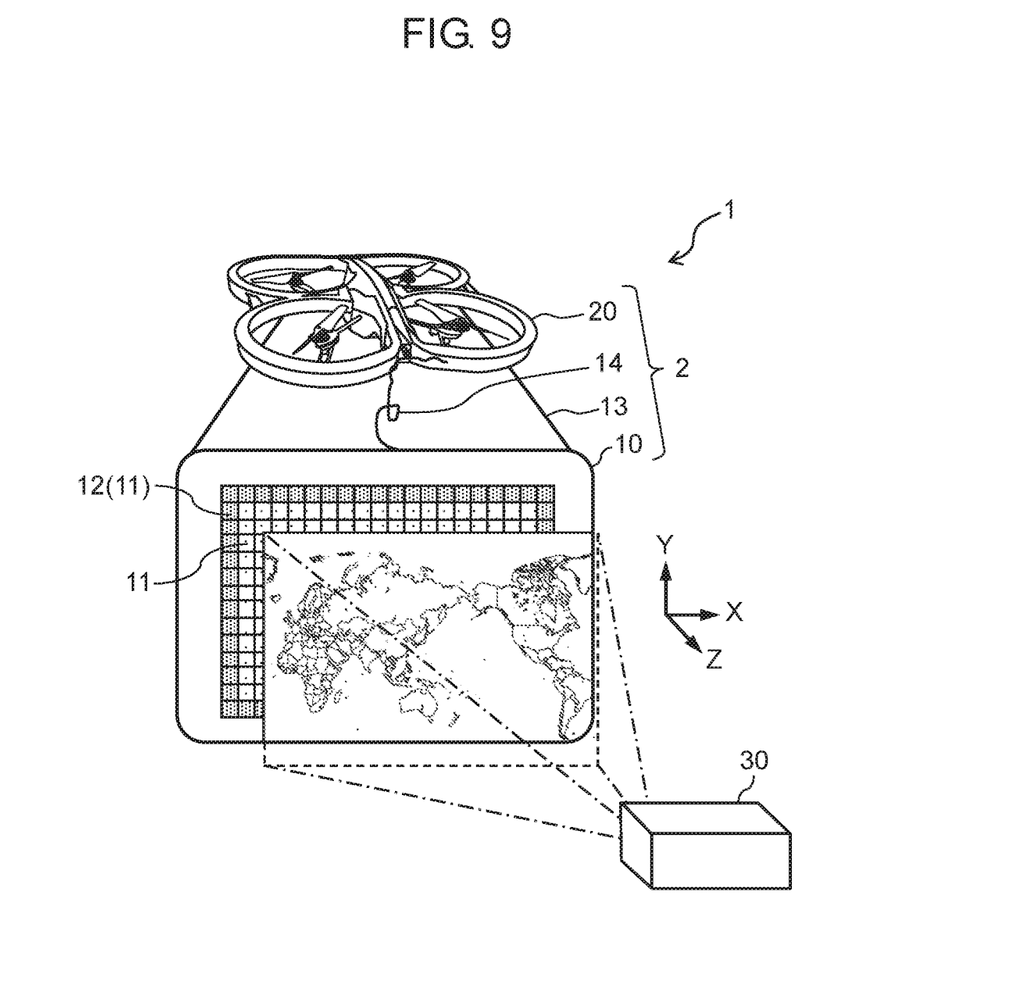
FIG. 9 is a schematic diagram illustrating the screen in accordance with the first exemplary embodiment shifted in X and Y directions.

FIG. 9 is a schematic diagram illustrating screen 10 shifted in both the X and Y directions. As shown in FIG. 9, there is a case that the area irradiated by the image light projected from image projection device 30 shifts in the X direction and/or the Y direction from the area in which photoelectric conversion elements 11 are arranged on screen 10. In this case, at around the boundary of the image light projected area, there exist an evaluation photoelectric conversion element 12 which receives the image light and another evaluation photoelectric conversion element 12 which does not receive the image light. The value of evaluation electric power generated by the evaluation photoelectric conversion element 12 which does not receive the image light is nearly zero, or sharply decreases to be smaller than 1/10 of the value of evaluation electric power generated by the adjacent evaluation photoelectric conversion element 12, which receives the image light. Accordingly, the determination result in step S58 becomes "Yes".

Incidentally, in a case where evaluation photoelectric conversion elements 12 are arranged continuously (without interspaces), there is a case that the image light is projected onto a part of one evaluation photoelectric conversion element 12. In this case, the value of evaluation electric power generated by such evaluation photoelectric conversion element sometimes become larger than 1/10 of the value of evaluation electric power generated by a previous or next (or right or left) evaluation photoelectric conversion element 12. In this case, evaluation electric power values may not be compared between adjacent two evaluation photoelectric conversion elements 12, and, instead, evaluation electric power values may be compared between one evaluation photoelectric conversion element 12 and a next to next evaluation photoelectric conversion element 12 in the arranged direction.

In a case where the evaluation electric power values of evaluation photoelectric conversion elements 12 are sharply decreasing ("Yes" in step S58), flight controller 25 controls flying object 20 to move vertically and/or horizontally (in the X direction and/or the Y direction) (step S64). In this control, flight controller 25 calculates a moving amount for flying object 20 based on the position of the evaluation photoelectric conversion element 12 at which the value of evaluation electric power is sharply decreasing, and causes flying object 20 to move so that the boundary of the image light projected area coincides with the periphery of the area in which photoelectric conversion elements 11 are arranged. Then, the operation flow returns to step S54.

In a case where the evaluation electric power values are not sharply decreasing ("No" in step S58), the operation flow returns to step S54.

With the configuration as described hereinabove, electric power can be supplied from a screen on which a plurality of photoelectric conversion elements are provided to a flying object that supports the screen to fly, so that the flying object can continue flying for a longer time. Also, the measuring unit measures the total electric power value and the evaluation electric power values generated by the photoelectric conversion elements on the screen, so that the electric power generated from the received light and the image light projected position on the screen can be optimally controlled.

Second Exemplary Embodiment

In the first exemplary embodiment, flying object 20 is moved or rotated to optimize the electric power generated by photoelectric conversion elements 11 and the image light projected position on screen 10. In the second exemplary embodiment, the brightness or the projection direction of the image projected by image projection device 30 is changed to optimize the electric power generated by photoelectric conversion elements 11 and the image light projected position on screen 10. The same components as those of the first exemplary embodiment will be respectively indicated by the same reference marks, and description on them will be omitted.

Figure 10:
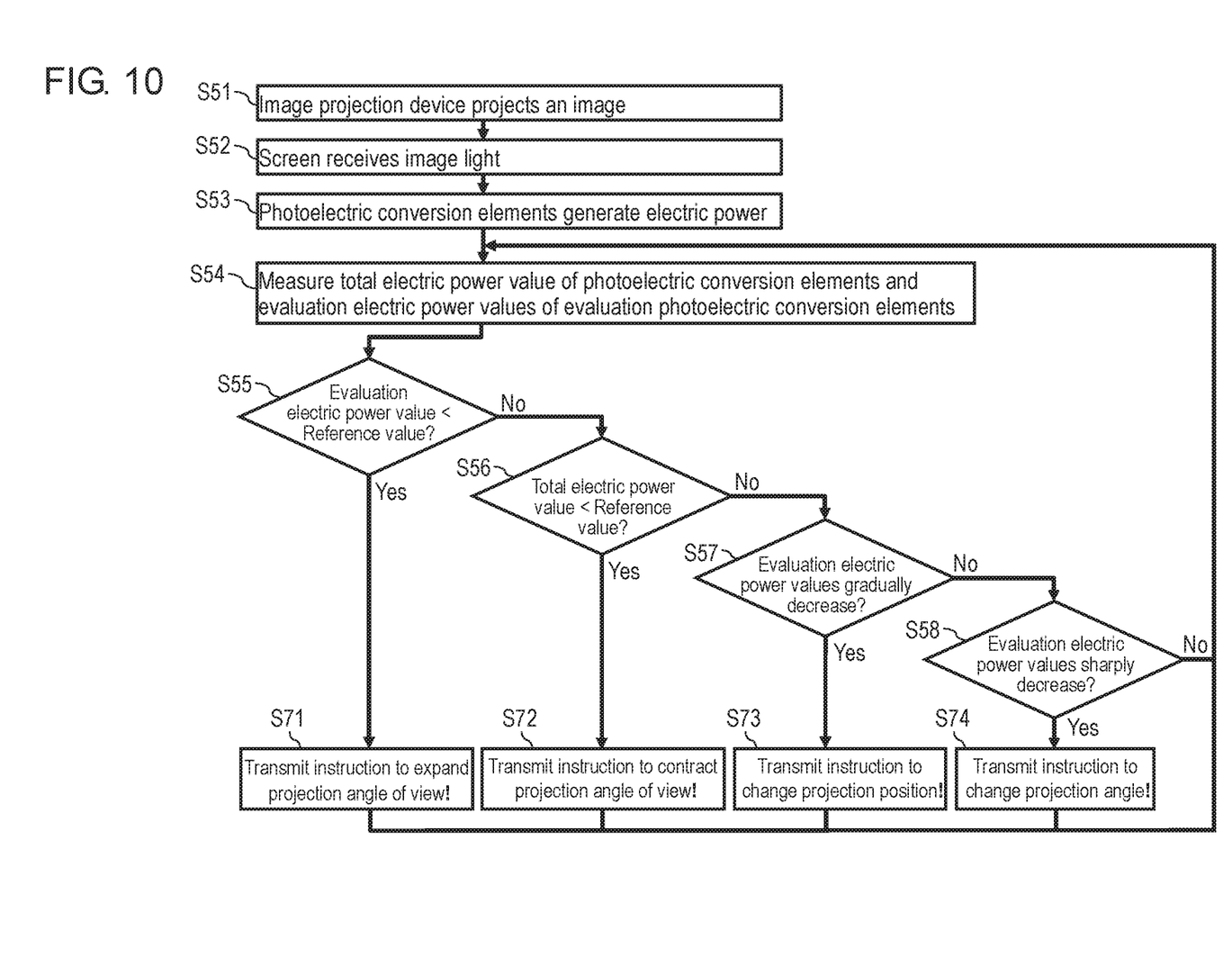
FIG. 10 is a flowchart illustrating operations of an image projection system in accordance with a second exemplary embodiment.

Operations of image projection system 1 in accordance with the present disclosure will be described. FIG. 10 is a flowchart illustrating operations of image projection system 1 in accordance with the second exemplary embodiment.

Steps S51 through S58 are the same as those in the first exemplary embodiment. Hereinafter, only flows related to steps S71 through S74, which are different from the first exemplary embodiment, will be described.

In a case where every value of evaluation electric power generated by evaluation photoelectric conversion elements 12 is smaller than the specified reference value ("Yes" in step S55), flight controller 25 causes flight communication unit 26 to transmit to projection communication unit 34 of image projection device 30 an instruction (a requirement signal) instructing to expand the projection angle of view of the projected image light (step S71). According to the instruction received by projection communication unit 34 instructing to expand the projection angle of view, projection controller 32 of image projection device 30 expands the projection angle of view of the projected image light. Then, the operation flow returns to step S54.

In a case where a value of evaluation electric power is not smaller than the specified reference value ("No" in step S55), flight controller 25 determines whether the total electric power value of photoelectric conversion elements 11 is smaller than the reference value (step S56). In a case where the total value of electric power is smaller than the reference value ("Yes" in step S56), flight controller 25 causes flight communication unit 26 to transmit to projection communication unit 34 of image projection device 30 an instruction (a requirement signal) instructing to contract the projection angle of view of the projected image light (step S72). According to the instruction received by projection communication unit 34 instructing to contract the projection angle of view, projection controller 32 of image projection device 30 contracts the projection angle of view of the projected image light. Then, the operation flow returns to step S54.

In a case where the total value of electric power is not smaller than the reference value ("No" in step S56), flight controller 25 determines whether the evaluation electric power values gradually decrease at a gradient within the specified range in the horizontally-arranged order of evaluation photoelectric conversion elements 12 (step S57). In a case where the evaluation electric power values are gradually decreasing ("Yes" in step S57), flight controller 25 causes flight communication unit 26 to transmit to projection communication unit 34 of image projection device 30 an instruction (a requirement signal) instructing to change the projection position of projection unit 33 (step S73). According to the instruction received by projection communication unit 34 instructing to change the projection position, projection controller 32 of image projection device 30 changes the position of projection unit 33. Then, the operation flow returns to step S54.

In a case where the evaluation electric power values are not gradually decreasing ("No" in step S57), flight controller 25 compares evaluation electric power values of adjacent two of evaluation photoelectric conversion elements 12 in their arranged order to determine whether the evaluation electric power values are sharply decreasing (step S58). In a case where the evaluation electric power values are sharply decreasing ("Yes" in step S58), flight controller 25 causes flight communication unit 26 to transmit to projection communication unit 34 of image projection device 30 an instruction (a requirement signal) instructing to change the projection angle of projection unit 33 (step S74). According to the instruction received by projection communication unit 34 instructing to change the projection angle, projection controller 32 of image projection device 30 changes the projection angle of projection unit 33. Then, the operation flow returns to step S54.

In a case where the evaluation electric power values are not sharply decreasing ("No" in step S58), the operation flow returns to step S54.

With the configuration as described above, the electric power generated from the received light and the image light projected position on the screen can be optimized by controlling image projection device 30, even when it is unable to control flying object 20 to move its position or when flying object 20 does not have a function of being controlled to move its position.

Third Exemplary Embodiment

In the second exemplary embodiment, flying object 20 transmits the instruction signal to image projection device 30 to change the projection condition of the image light. In the third exemplary embodiment, flying object 20 transmits the total value of electric power and the evaluation electric power values to image projection device 30, and image projection device 30 changes the projection condition of the image light. The same components as those of the first exemplary embodiment are respectively indicated by the same reference marks, and description on them will be omitted.

Figure 11:
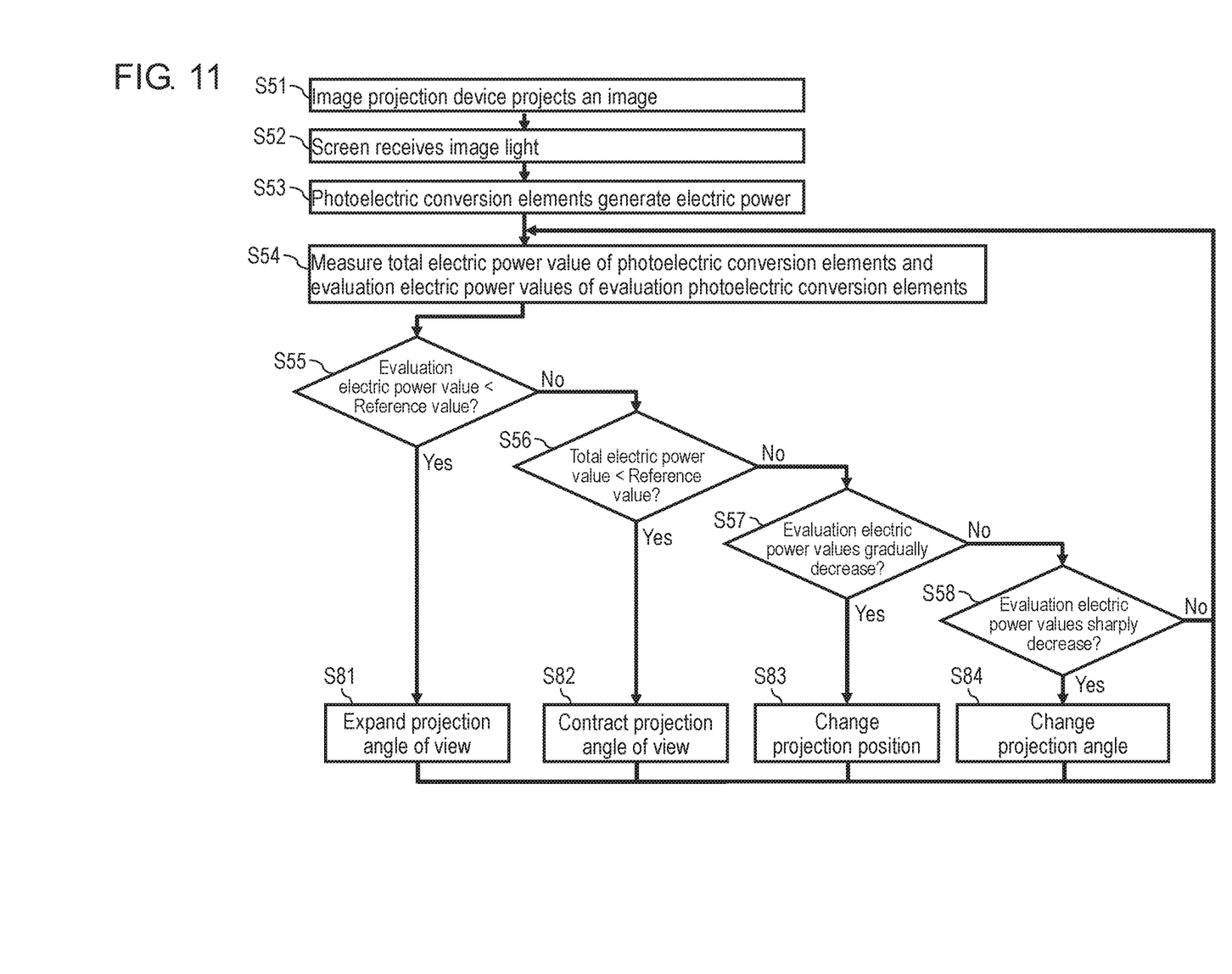
FIG. 11 is a flowchart illustrating operations of an image projection system in accordance with a third exemplary embodiment.

Operations of image projection system 1 in accordance with the present disclosure will be described. FIG. 11 is a flowchart illustrating operations of image projection system 1 in accordance with the third exemplary embodiment.

Steps S51 through S58 are the same as those in the first exemplary embodiment. Hereinafter, only flows related to steps S81 through S84, which are different from the first and second exemplary embodiments, will be described.

In a case where every value of evaluation electric power generated by evaluation photoelectric conversion elements 12 is smaller than the reference value ("Yes" in step S55), flight controller 25 transmits the evaluation electric power values from flight communication unit 26 to projection communication unit 34 of image projection device 30. Based on the evaluation electric power values received by projection communication unit 34, projection controller 32 of image projection device 30 expands the projection angle of view of the projected image light (step S81). Then, the operation flow returns to step S54.

In a case where a value of evaluation electric power is not smaller than the reference value ("No" in step S55), flight controller 25 determines whether the total electric power value of photoelectric conversion elements 11 is smaller than the reference value (step S56). In a case where the total value of electric power is smaller than the reference value ("Yes" in step S56), flight controller 25 transmits the evaluation electric power values from flight communication unit 26 to projection communication unit 34 of image projection device 30. Based on the evaluation electric power values received by projection communication unit 34, projection controller 32 of image projection device 30 contracts the projection angle of view of the projected image light (step S82). Then, the operation flow returns to step S54.

In a case where the total value of electric power is not smaller than the reference value ("No" in step S56), flight controller 25 determines whether the evaluation electric power values are gradually decreasing at a gradient within the specified range in the horizontally-arranged order of evaluation photoelectric conversion elements 12 (step S57). In a case where the evaluation electric power values are gradually decreasing ("Yes" in step S57), flight controller 25 transmits the evaluation electric power values from flight communication unit 26 to projection communication unit 34 of image projection device 30. Projection controller 32 of image projection device 30 calculates such a projection position of projection unit 33 that eliminates the gradient of decrease in the evaluation electric power values received by projection communication unit 34, and causes projection driver 35 to change the projection position of projection unit 33 (step S83). Then, the operation flow returns to step S54.

In a case where the evaluation electric power values are not gradually decreasing ("No" in step S57), flight controller 25 compares evaluation electric power values of adjacent two of evaluation photoelectric conversion elements 12 in the order of their arrangement to determine whether the evaluation electric power values are sharply decreasing (step S58). In a case where the evaluation electric power values are sharply decreasing ("Yes" in step S58), flight controller 25 transmits the evaluation electric power values from flight communication unit 26 to projection communication unit 34 of image projection device 30. Projection controller 32 of image projection device 30 calculates a projection angle of projection unit 33 from a position at which the evaluation electric power values received by projection communication unit 34 sharply change, and causes projection driver 35 to change the projection angle of projection unit 33 (step S84). Then, the operation flow returns to step S54.

In a case where the evaluation electric power values are not sharply decreasing ("No" in step S58), the operation flow returns to step S54.

With the configuration as described above, in a case where flight controller 25 of flying object 20 does not have a high computation capability that is required to calculate a receiving state of the image light from the total value of electric power and the evaluation electric power values, image projection device 30 performs such calculation, so that the electric power generated from the received light and the image light projected position on the screen can be optimized.

Although the decisions in steps S55 to S58 are made by flight controller 25 in the present exemplary embodiment, the decisions may be made by projection controller 32 of image projection device 30. In this case, flight controller 25 of flight vehicle 20 does not make decisions in steps S55 through S58, but transmits the total value of electric power and the evaluation electric power values measured by measurement unit 22 to projection communication unit 34 of image projection device 30 through flight communication unit 26. Then, projection controller 32 makes decisions in steps S55 through S58 based on the received total electric power value and the received evaluation electric power values. This is advantageous to further reduce the computation load for flight controller 25 of flight vehicle 20.

Although the projection angle of view is contracted to increase the total value of electric power in the present exemplary embodiment, the brightness of the projected light from image projection device 30 may be increased to increase the total value of electric power.

Other Exemplary Embodiments

The techniques according to the present disclosure are not limited to the first to third exemplary embodiments, and may be applied to other exemplary embodiments in which modifications, substitutions, additions or deletions are appropriately made. Also, the components described in the first to third exemplary embodiments may appropriately be combined to produce a new exemplary embodiment.

Although decisions are made in the order of steps S55 to S58 in the first through third exemplary embodiments, the order of steps S55 to S58 may appropriately be changed.

Also, the first through third exemplary embodiments may be combined to perform moving flying object 20, changing the projection position of image light from image projection device 30, and so on.

Although the brightness of the image is changed by measuring the total electric power generated by photoelectric conversion elements 11 in the first through third exemplary embodiments, the brightness of the image may be changed by measuring the remaining charge of power storage unit 23. Also, the brightness may be changed step by step or may be changed several steps at a time depending on the total generated electric power or the kind of power storage unit 23.

Although visible image light is projected onto screen 10 in the cases described in the first through third exemplary embodiments, invisible light such, for example, infrared light or ultraviolet light, may be superposed on the visible image light, and electric power may be generated from the waveform components of the invisible light. In this case, photoelectric conversion elements 11 can stably supply electric power regardless of the brightness of the image.

Although flying object 20 is a helicopter type in the first through third exemplary embodiments, flying object 20 may be another type such, for example, as an airplane type or an airship type. The airship type flying object can fly longer because it can be lifted with less power.

Although flight controller 25 of flying object 20 decides the moving amount of flying object 20 in the first exemplary embodiment, the total electric power value of photoelectric conversion elements 11 and the evaluation electric power values of evaluation photoelectric conversion elements 12 may be transmitted from flight communication unit 26 to projection communication unit 34, and projection controller 32 of image projection device 30 may calculates the moving amount of flying object 20. In this case, projection communication unit 34 transmits the moving amount to flight communication unit 26, and flight controller 25 causes propulsion unit 24 to move flying object 20.

Further, the image light projected onto the screen may contain an image of white (bright), monochrome frame. This improves the measurement accuracy for the evaluation electric power values of evaluation photoelectric conversion elements 12, and makes it possible to detect a shift of the image light from the screen regardless of the brightness of the image light. In this case, the width of the monochrome frame may preferably be approximately the same as the width or the height of each evaluation photoelectric conversion element 12.

Although the outermost photoelectric conversion elements 11 among photoelectric conversion elements 11 arranged in a matrix are used as evaluation photoelectric conversion elements 12 in the first through third exemplary embodiments, a plurality of evaluation photoelectric conversion elements 12 may be disposed outside of the area in which photoelectric conversion elements 11 are arranged. In this case, evaluation photoelectric conversion elements 12 may receive the image light from the image projection device or may receive other light that is projected from the image projection device separately from the image light. The positional relation between screen 10 and the image light may be adjusted based on the evaluation electric power values generated from the light received by evaluation photoelectric conversion elements 12.

Although the electric power generated by photoelectric conversion elements 11 is charged in power storage unit 23 in the first through third exemplary embodiments, the electric power may be directly supplied to propulsion unit 24.

Further, flight communication unit 26 of flying object 20 may communicate with another unit different from projection communication unit 34 of image projection device 30. For example, flight communication unit 26 may communicate with a remote controller that is operated by a human operator, and the operator may fly flying object 20.

Although flying object 20 supports screen 10 in the first through third exemplary embodiments, flying object 20 may also support image projection device 30. With this arrangement, the positional relation between screen 10 and image projection device 30 is fixed, so that no positional shift occurs between screen 10 and the image light. In this case also, flying object 20 can fly by using the electric power generated by photoelectric conversion elements 11 from the image light received from image projection device 30.

Further, screen 10 may not be limited to a flat shape screen, and may be formed in a curved surface shape or a spherical surface shape. For example, screen 10 may be formed as a cylindrical shape or a globular shape. In this case, image projection device 30 may be disposed within a space surrounded by screen 10, and projects light onto screen 10 from the inside of screen 10.

Further, although screen device 2 and image projection device 30 are described as separate devices, screen device 2 and image projection device 30 may be configured as one device. Image projection device 30 may move integrally with screen device 2.

INDUSTRIAL APPLICABILITY

A screen device and an image projection system according to the present disclosure make it possible to fly a flying object for a long time. Accordingly, the present disclosure is applicable to screen devices and image projection systems that have a screen supported with a flying object for receiving image light from an image projection device.

REFERENCE MARKS IN THE DRAWINGS 1 image projection system
2 screen device
10 screen
11 photoelectric conversion element
12 evaluation photoelectric conversion element
13 support member 14 cable
20 flying object
21 power supply unit
22 measurement unit
23 power storage unit
24 propulsion unit
25 flight controller
26 flight communication unit
30 image projection device
31 image receiver
32 projection controller
33 projection unit
34 projection communication unit
35 projection driver

The invention claimed is:

1. A screen device comprising:
a screen;
a plurality of photoelectric conversion elements on the screen comprising:
  a plurality of first photoelectric conversion elements being arranged at an outermost periphery, in a frame shape, of an area in which the plurality of photoelectric conversion elements are arranged, and
  a plurality of second photoelectric conversion elements being arranged inside of the outermost periphery covered by the plurality of first photoelectric conversion elements within the area in which the plurality of photoelectric conversion elements are arranged;
a flying object configured to be powered by electric power generated by the plurality of second photoelectric conversion elements;
a support member connecting the screen with the flying object; and
a controller configured to control the flying object based on an evaluation of electric power generated by the plurality of first photoelectric conversion elements,
wherein the controller is configured to determine whether the electric power generated by the plurality of first photoelectric conversion elements is less than a first reference value,
wherein in response to the determination that the electric power generated by the plurality of first photoelectric conversion elements is less than the first reference value, the controller is configured to cause the flying object to move in a first direction,
wherein in response to the determination that the electric power generated by the plurality of first photoelectric conversion elements is not less than the first reference value, the controller is configured to determine whether a total electric power generated by both the plurality of first photoelectric conversion elements and the plurality of second photoelectric conversion elements is less than a second reference value, the second reference value being larger than the first reference value, and
wherein in response to the determination that the total electric power generated is less than the second reference value, the controller is configured to cause the flying object to move in a second direction, the second direction being an opposite direction of the first direction.

2. An image projection system comprising:
the screen device according to claim 1; and
a projector configured to project an image on the screen of the screen device.

3. The image projection system according to claim 2, wherein the first direction is from the projector toward the screen device.

4. The image projection system according to claim 2, wherein the second direction is from the screen device toward the projector.

5. The image projection system according to claim 2, wherein
the screen device includes a transmitter configured to transmit information, and
the projector includes a receiver configured to receive the information transmitted by the transmitter.

6. The image projection system according to claim 5, wherein the projector includes a controller configured to control projection of the image, based on the information received by the receiver.

7. The image projection system according to claim 2, wherein the plurality of first photoelectric conversion elements and the plurality of second photoelectric conversion elements receive light from the projector and convert the light into electric power.

* * * * *